US012165081B2

(12) United States Patent
Mattivi et al.

(10) Patent No.: US 12,165,081 B2
(45) Date of Patent: Dec. 10, 2024

(54) MACHINE LEARNING TECHNIQUES FOR ELIGIBILITY PREDICTION DETERMINATIONS

(71) Applicant: Optum Services (Ireland) Limited, Dublin (IE)

(72) Inventors: Riccardo Mattivi, Dublin (IE); Venkata Krishnan Mittinamalli Thandapani, Dublin (IE); Conor Breen, Dublin (IE); Peter Cogan, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 309 days.

(21) Appl. No.: 17/654,322

(22) Filed: Mar. 10, 2022

(65) Prior Publication Data
US 2023/0289627 A1 Sep. 14, 2023

(51) Int. Cl.
*G10L 15/22* (2006.01)
*G06F 40/166* (2020.01)
*G06F 40/284* (2020.01)
*G06N 5/02* (2023.01)
*G06N 5/04* (2023.01)

(52) U.S. Cl.
CPC ............ *G06N 5/04* (2013.01); *G06F 40/166* (2020.01); *G06F 40/284* (2020.01); *G06N 5/027* (2013.01)

(58) Field of Classification Search
None
See application file for complete search history.

(56) References Cited

U.S. PATENT DOCUMENTS

| 8,762,181 | B1 | 6/2014 | Ringold |
| 9,002,703 | B1* | 4/2015 | Crosley ............... G06Q 10/101 704/235 |
| 10,331,402 | B1* | 6/2019 | Spector ............... G10L 15/1815 |
| 11,475,067 | B2* | 10/2022 | Nogueira Dos Santos ................. G06F 18/2148 |
| 11,599,927 | B1* | 3/2023 | Flunkert ............... G06F 40/30 |
| 11,763,085 | B1* | 9/2023 | Alikaniotis ............ G06N 20/00 704/9 |
| 2012/0143637 | A1 | 6/2012 | Paradis et al. |
| 2014/0272884 | A1* | 9/2014 | Allen ...................... G06N 5/04 434/322 |
| 2015/0127346 | A1* | 5/2015 | Gruenstein ............ G10L 15/08 704/254 |

(Continued)

OTHER PUBLICATIONS

"AI Software Turns Uncompensated Care Into Revenue." Quality Reimbursement Services, (9 pages), (article), (online), [Retrieved from the Internet Jun. 16, 2022] <URL: https://qualityreimbursement.com/services>.

(Continued)

*Primary Examiner* — Neeraj Sharma
(74) *Attorney, Agent, or Firm* — Alston & Bird LLP

(57) ABSTRACT

Various embodiments of the present invention provide methods, apparatus, systems, computing devices, computing entities, and/or the like for performing predictive data analysis operations. For example, certain embodiments of the present invention utilize systems, methods, and computer program products that perform predictive data analysis operations by generating a predicted eligibility score for a predictive entity using a cross-feature-type eligibility prediction machine learning framework.

20 Claims, 13 Drawing Sheets

(56) References Cited

U.S. PATENT DOCUMENTS

| | | | |
|---|---|---|---|
| 2015/0370976 | A1 | 12/2015 | Pinsonneault et al. |
| 2016/0014795 | A1 | 1/2016 | Yonehara |
| 2016/0321410 | A1 | 11/2016 | Timmerman et al. |
| 2016/0358286 | A1 | 12/2016 | Sallee |
| 2018/0122499 | A1 | 5/2018 | Austin et al. |
| 2019/0051416 | A1 | 2/2019 | Monteverde |
| 2019/0197422 | A1* | 6/2019 | Chen ................. G06F 18/29 |
| 2020/0019946 | A1 | 1/2020 | Walker et al. |
| 2021/0248268 | A1 | 8/2021 | Ardhanari et al. |
| 2021/0374395 | A1* | 12/2021 | Tata ................. G06V 30/413 |
| 2022/0188366 | A1* | 6/2022 | Song ................. G06F 40/40 |
| 2022/0284172 | A1* | 9/2022 | Rebo ................. G06N 3/0455 |
| 2022/0300756 | A1* | 9/2022 | Sekar ................. G06N 20/00 |
| 2022/0366293 | A1* | 11/2022 | Abhishek ............ G06F 40/284 |
| 2022/0366344 | A1* | 11/2022 | Shi ................. G06Q 10/06393 |
| 2023/0081171 | A1* | 3/2023 | Zhang ................. G06V 10/82 |
| | | | 382/157 |
| 2023/0168989 | A1* | 6/2023 | Chatterjee ........... G06F 11/0775 |
| | | | 714/25 |

OTHER PUBLICATIONS

"Coordination of Benefits & Recovery Overview," Centers For Medicare & Medicaid Services, CMS.gov, Dec. 1, 2021, (5 pages), (article), (online), [Retrieved from the Internet Jun. 19, 2022] <URL: https://www.cms.gov/Medicare/Coordination-of-Benefits-and-Recovery/Coordination-of-Benefits-and-Recovery-Overview/Coordination-of-Benefits/Coordination-of-Benefits>.

"Medicare Information—Coronavirus (COVID-19) Updates," Social Security, (11 pages), (article), (online), [Retrieved from the Internet Jun. 16, 2022] <URL: https://www.ssa.gov/disabilityresearch/wi/medicare.htm>.

"Medicare Secondary Payer Disability Introduction," Centers for Medicare & Medicaid Services, Apr. 4, 2022, pp. 1-22, available online at URL: https://www.cms.gov/Medicare/Coordination-of-Benefits-and-Recovery/Coordination-of-Benefits-and-Recovery-Overview/Medicare-Secondary-Payer/Downloads/Medicare-Secondary-Payer-Disability.pdf.

Ben-Shalom, Yonatan et al. "Predicting Disability Among Community-Dwelling Medicare Beneficiaries Using Claims-Based Indicators," Health Research and Educational Trust, vol. 51, No. 1, Feb. 2016, pp. 262-281, DOI: 10.1111/1475-6773.12316.

Lai, Jeremy. "Concept Extraction For Disability Insurance Payment Evaluation," Doctoral Dissertation, Massachusetts Institute of Technology, Jun. 2011, (28 pages).

Layton, Timothy J. et al. "Predicting Disability Enrollment Using Machine Learning," National Bureau of Economic Research, Nov. 21, 2019, (23 pages).

Sommers, Anna S. "Access To Health Insurance, Barriers To Care, and Service Use Among Adults With Disabilities," Inquiry: The Journal of Health Care Organization, Provision, and Financing, vol. 43, No. 4, pp. 393-405.

* cited by examiner

| Structured Feature Data for Feature Type Instance 1 of Instantiable Feature Type A |||||||
|---|---|---|---|---|---|---|
| Non-Instantiable Feature Type | DRG | DX | DX | DX | ICD | MBR | MBR |
| Structured Feature Data Entry | 470 | E119 | M10 | Z950 | OSRC0J9 | 62 | F |

801 → 470 M1711 E119 I10 Z950 E785 OSRC0J9 62 F

FIG. 8A

802 → DRG470 DXM1711 DXE119 DXI10 DXZ950 DXE785 ICD0SRC0J9 MBR62 MBRF

FIG. 8B

803 → 470DRG M1711DX E119DX I10DX Z950DX E785DX OSRC0J9ICD 62MBR FMBR

FIG. 8C

| Structured Feature Data for Feature Type Instance *N* of Instantiable Feature Type A | | | | | |
|---|---|---|---|---|---|
| Non-Instantiable Feature Type | DRG | DX | ICD | MBR | MBR |
| Structured Feature Data Entry | 304 | I10 | I11.9 | 62 | F |

1001 ⟶ *DRG304 DXI10 ICDI11.9 MBR62 MBRF*

FIG. 10

Feature Type Paragraph - Instantiable Feature Type A

*DRG470 DXM1711 DXE119 DX|10 DXZ950 DXE785 ICD0SRC0J9 MBR62 MBRf*

. . .

*DRG304 DX|10 ICD|11.9 MBR62 MBRF*

FIG. 11

Cross Feature Type Representation

Feature Type Paragraph - Instantiable Feature Type A

Feature Type Paragraph - Instantiable Feature Type B

. . .

Feature Type Paragraph - Instantiable Feature Type Z

MACHINE LEARNING TECHNIQUES FOR ELIGIBILITY PREDICTION DETERMINATIONS

BACKGROUND

Various embodiments of the present invention address technical challenges related to accurately determining eligibility predictions for a predictive entity using structured feature data. In doing so, various embodiments of the present invention make important contributions to various existing predictive data analysis systems.

BRIEF SUMMARY

In general, embodiments of the present invention provide methods, apparatuses, systems, computing devices, computing entities, and/or the like for generating a predicted eligibility score for a predicted entity using structured feature data associated with said predictive entity.

In accordance with one aspect, a method includes: generating, based at least in part on structured feature data associated with a predictive entity, a plurality of feature words, wherein each feature word is associated with an instantiable feature type of a plurality of instantiable feature types defined by an instantiable feature type schema; generating a plurality of feature type paragraphs, wherein each feature type paragraph is associated with a respective instantiable feature type and comprises a related feature word subset of the plurality of feature words which are associated with the respective instantiable feature type; generating, using a cross-feature-type eligibility prediction machine learning framework and based at least in part on the plurality of feature type paragraphs, a predicted eligibility score for the predictive entity, wherein the eligibility prediction machine learning framework comprises: (i) one or more feature processing machine learning models that are configured to process the plurality of feature type paragraphs to generate a cross-feature-type representation of the structured feature data, and (ii) an eligibility prediction machine learning model that is configured to generate the predicted eligibility score based at least in part on the cross-feature-type representation; and performing, using the one or more processors, one or more prediction-based actions based at least in part on the predicted eligibility score.

In accordance with another aspect, an apparatus comprising at least one processor and at least one memory including program code, the at least one memory and the program code configured to, with the processor, cause the apparatus to at least: generate, based at least in part on structured feature data associated with a predictive entity, a plurality of feature words, wherein each feature word is associated with an instantiable feature type of a plurality of instantiable feature types defined by an instantiable feature type schema; generate a plurality of feature type paragraphs, wherein each feature type paragraph is associated with a respective instantiable feature type and comprises a related feature word subset of the plurality of feature words which are associated with the respective instantiable feature type; generate, using a cross-feature-type eligibility prediction machine learning framework and based at least in part on the plurality of feature type paragraphs, a predicted eligibility score for the predictive entity, wherein the eligibility prediction machine learning framework comprises: (i) one or more feature processing machine learning models that are configured to process the plurality of feature type paragraphs to generate a cross-feature-type representation of the structured feature data, and (ii) an eligibility prediction machine learning model that is configured to generate the predicted eligibility score based at least in part on the cross-feature-type representation; and perform, using the one or more processors, one or more prediction-based actions based at least in part on the predicted eligibility score.

In accordance with yet another aspect, a computer program product computer program comprising at least one non-transitory computer-readable storage medium having computer-readable program code portions stored therein, the computer-readable program code portions configured to: generate, based at least in part on structured feature data associated with a predictive entity, a plurality of feature words, wherein each feature word is associated with an instantiable feature type of a plurality of instantiable feature types defined by an instantiable feature type schema; generate a plurality of feature type paragraphs, wherein each feature type paragraph is associated with a respective instantiable feature type and comprises a related feature word subset of the plurality of feature words which are associated with the respective instantiable feature type; generate, using a cross-feature-type eligibility prediction machine learning framework and based at least in part on the plurality of feature type paragraphs, a predicted eligibility score for the predictive entity, wherein the eligibility prediction machine learning framework comprises: (i) one or more feature processing machine learning models that are configured to process the plurality of feature type paragraphs to generate a cross-feature-type representation of the structured feature data, and (ii) an eligibility prediction machine learning model that is configured to generate the predicted eligibility score based at least in part on the cross-feature-type representation; and perform, using the one or more processors, one or more prediction-based actions based at least in part on the predicted eligibility score.

BRIEF DESCRIPTION OF THE DRAWINGS

Figure 1:
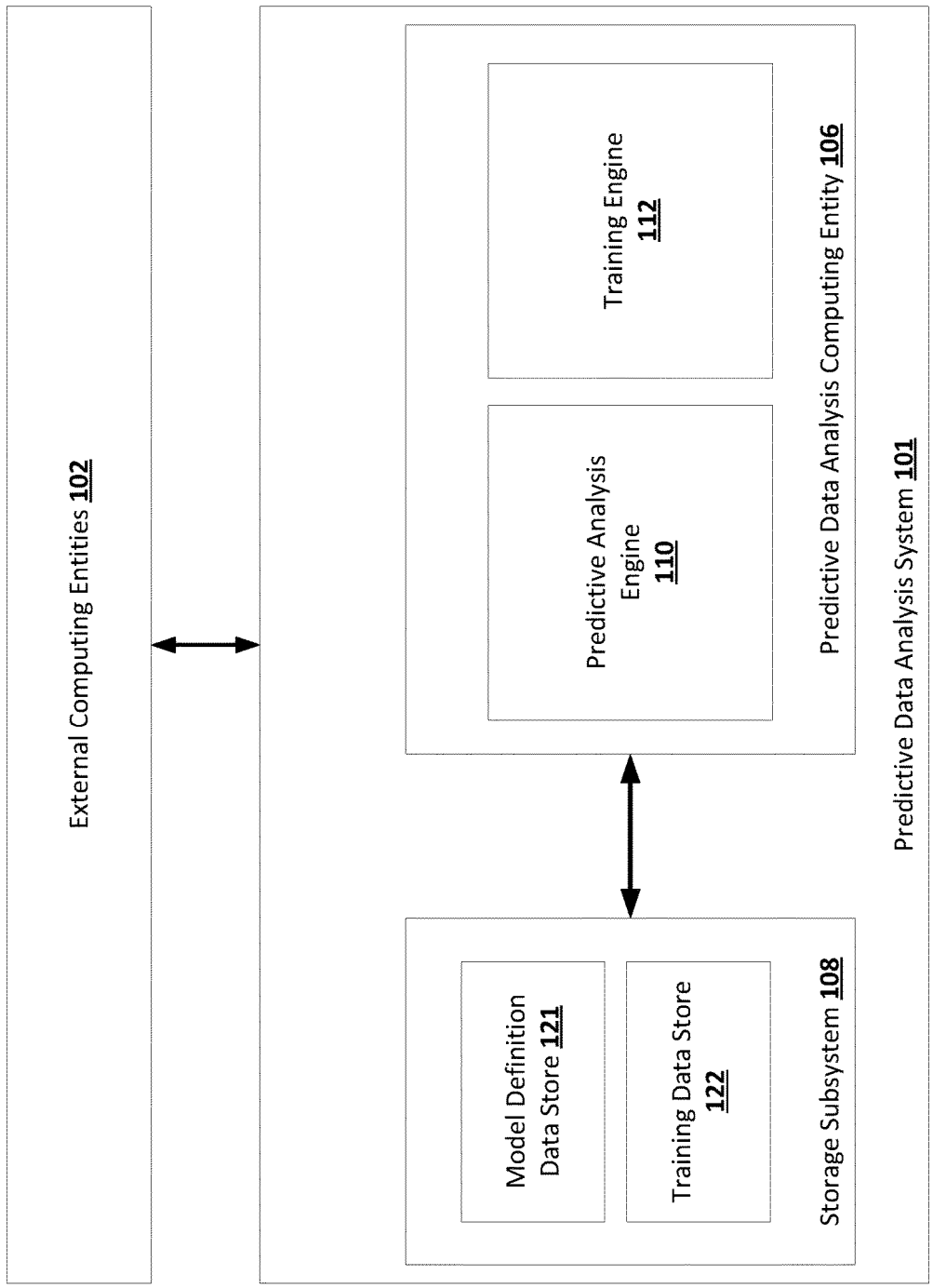

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
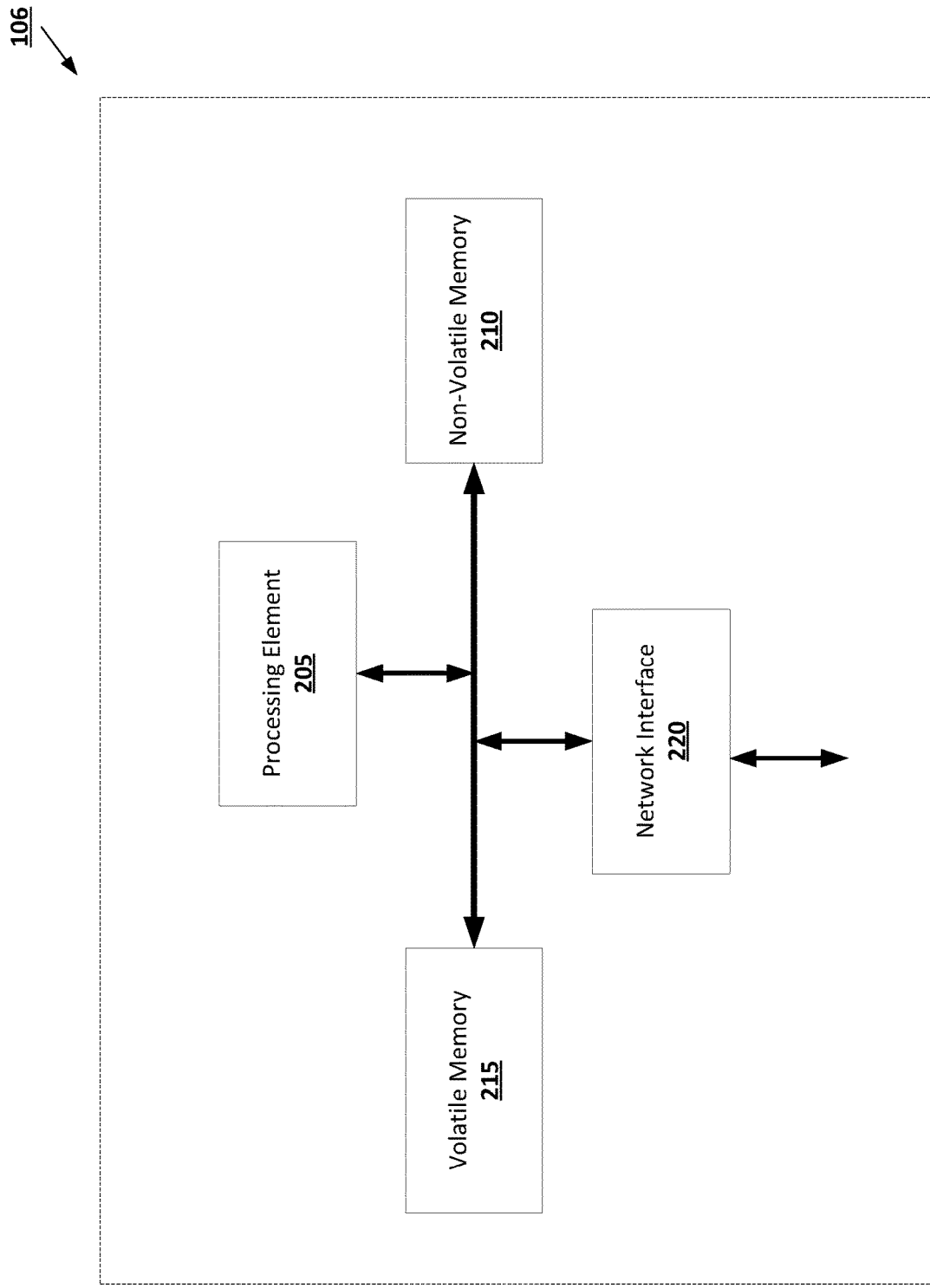

FIG. 2 provides an example predictive data analysis computing entity in accordance with some embodiments discussed herein.

Figure 3:
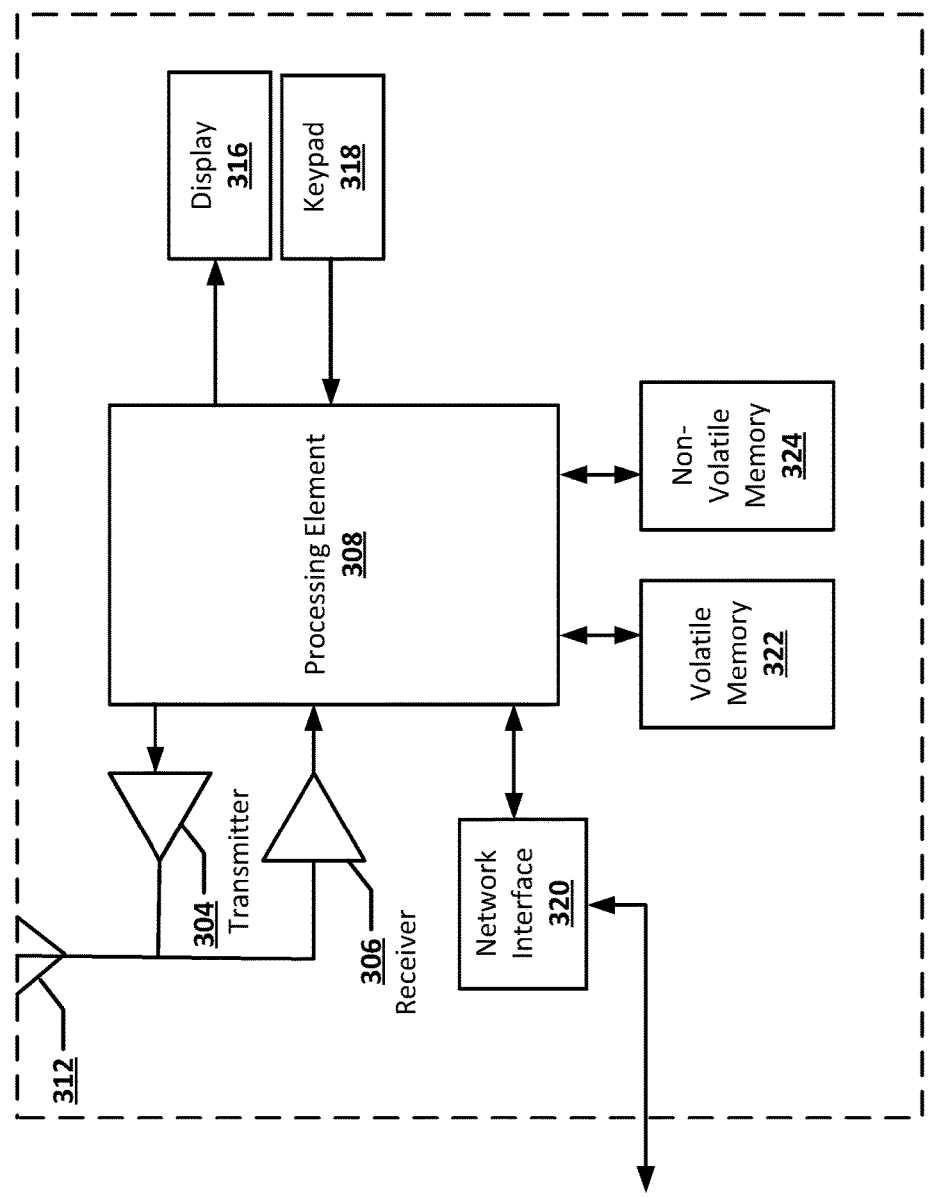

FIG. 3 provides an example external computing entity in accordance with some embodiments discussed herein.

Figure 4:
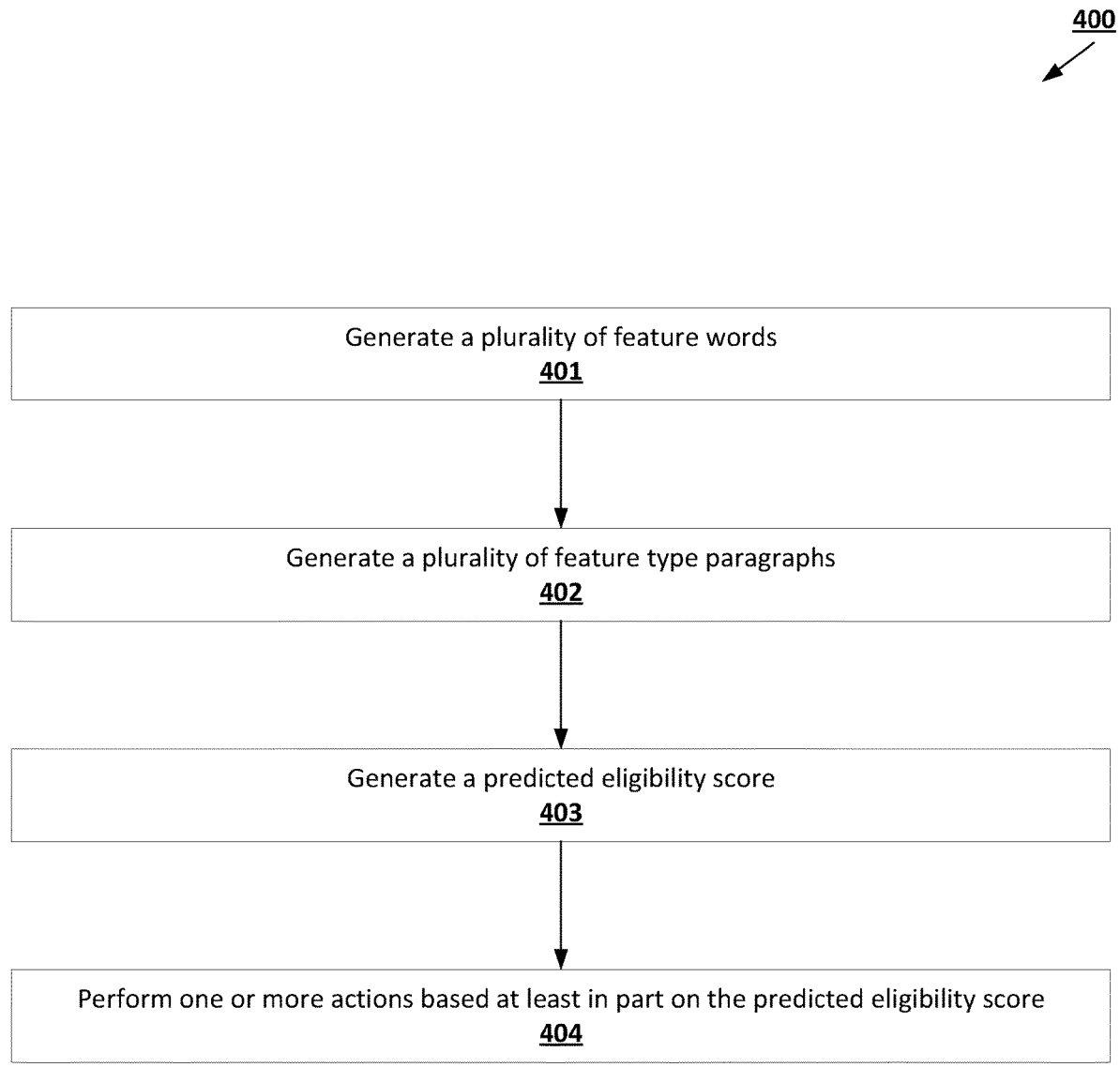

FIG. 4 provides a flowchart diagram of an example process for generating a predicted eligibility score for a predictive entity in accordance with some embodiments discussed herein.

Figure 5:
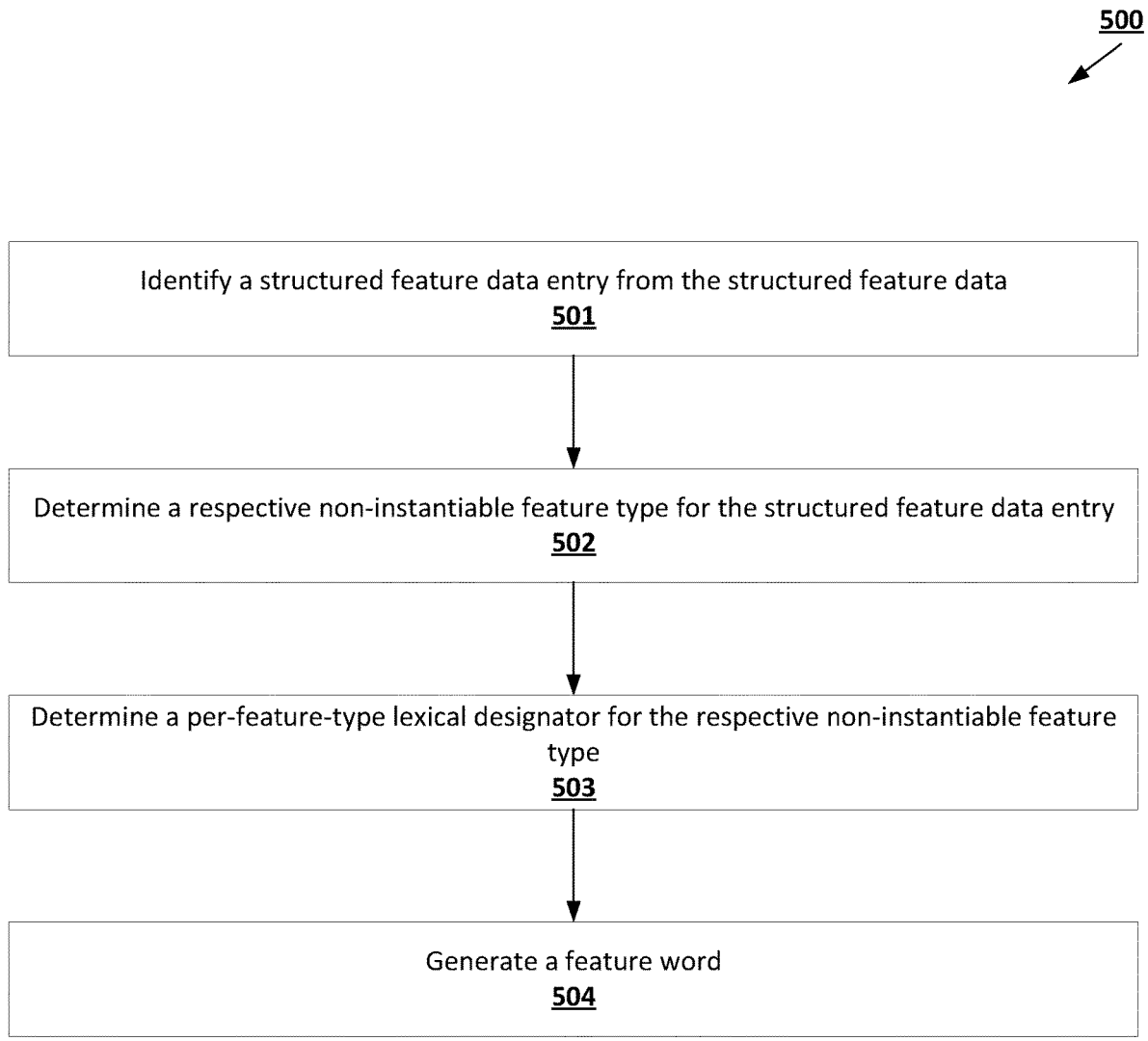

FIG. 5 provides a flowchart diagram of an example process for generating a feature word in accordance with some embodiments discussed herein.

Figure 6:
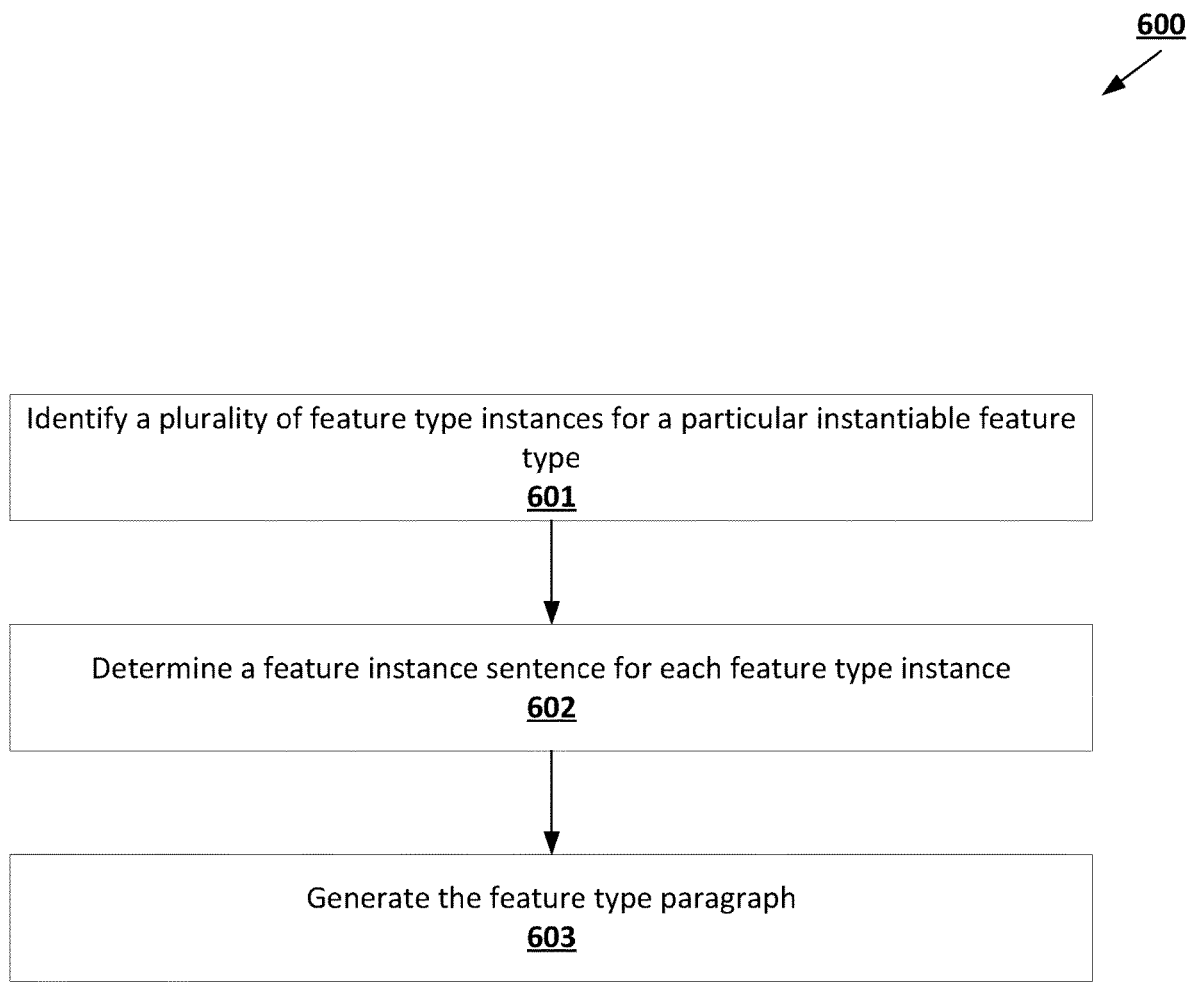

FIG. 6 provides a flowchart diagram of an example process for generating a feature type paragraph in accordance with some embodiments discussed herein.

FIG. 7 provides an operational example of feature words that are associated with an instantiable feature type for a first feature type instance in accordance with some embodiments discussed herein.

FIGS. 8A-C provide operational examples of feature instance sentences corresponding to a first feature type instance in accordance with some embodiments discussed herein.

FIG. 9 provides an operational example of feature words that are associated with an instantable feature type for an nth feature type instance in accordance with some embodiments discussed herein.

FIG. 10 provides an operational example of feature instance sentence corresponding to the nth feature type instance in accordance with some embodiments discussed herein.

FIG. 11 provides an operational example of a feature type paragraph associated with an instantable feature type A in accordance with some embodiments discussed herein.

Figure 12:
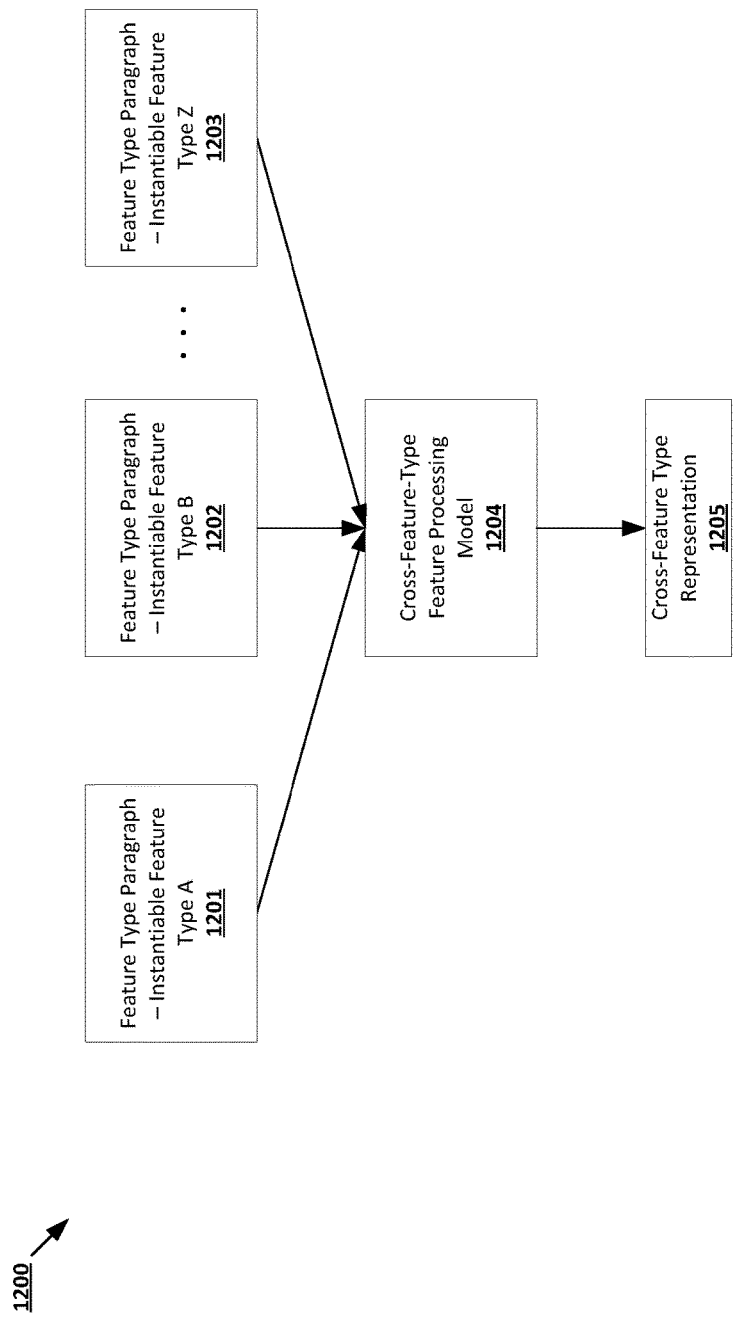

FIG. 12 illustrates an exemplary feature processing machine learning model which comprises a cross-feature-type feature processing machine learning model in accordance with some embodiments discussed herein.

Figure 13:
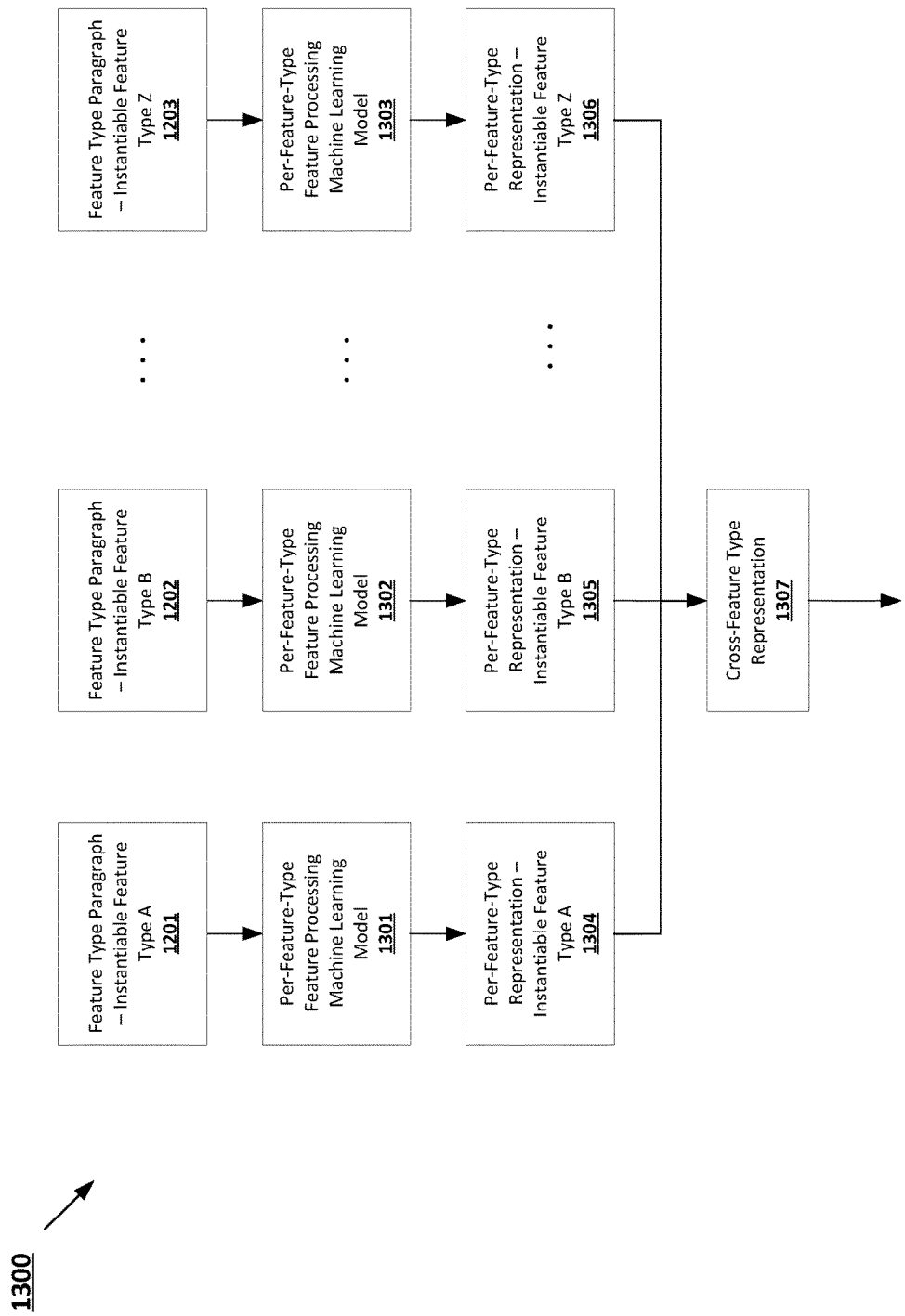

FIG. 13 illustrates exemplary feature processing machine learning models which comprise a plurality of per-feature-type feature processing machine learning models in accordance with some embodiments discussed herein.

Figure 14:

FIG. 14 provides an operational example of a cross-feature type representation format in accordance with some embodiments discussed herein.

Figure 15:
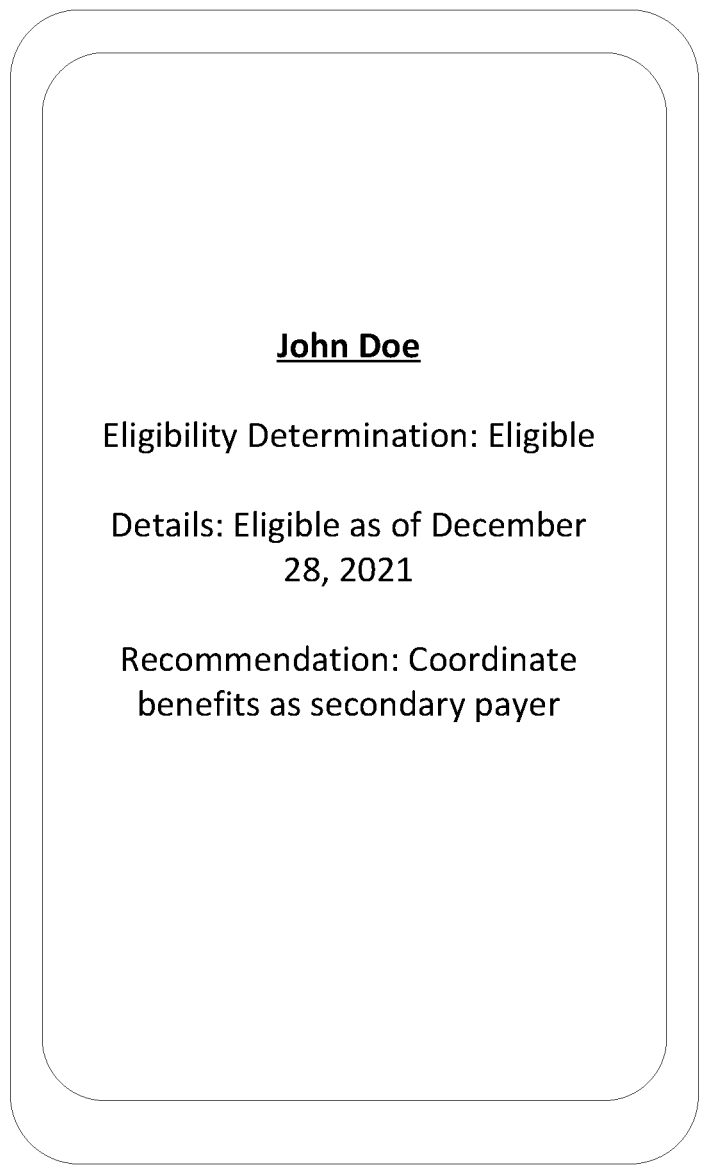

FIG. 15 provides an operational example of an eligibility alert notification that may be generated in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention make important technical contributions to storage-wise efficiency and computational efficiency of performing predictive data analysis using structured data by mapping structured feature data to structured text data (e.g., natural language data having paragraphs and documents). After converting the structured feature data to structured text data, the structured text data can now be used as input data to natural language processing machine learning models (e.g., attention-based natural language processing machine learning models) that can be pre-trained and/or trained without using labeled training data (e.g., using auxiliary tasks such as missing, masked, and/or replaced word prediction or sentence reconstruction). In fact, in many instances, such attention-based natural language processing machine learning models are pretrained and require no additional training/retraining. Accordingly, by using the techniques described herein, predictive data analysis systems can either train machine learning models that perform predictive data analysis on structured feature data with smaller amounts of labeled training data (or even with no labeled training data, as in the case of zero-shot learning) or can altogether avoid training at least some components of the noted machine learning models (e.g., the components that are configured to generate embedded representations of structured feature data). In this way, the noted embodiments of the present invention reduce both the size of training data needed to train machine learning models that perform predictive data analysis on structured feature data and the number of computational operations needed to train machine learning models that perform predictive data analysis on structured feature data. In this way, various embodiments of the present invention make important technical contributions to storage-wise efficiency and computational efficiency of performing predictive data analysis using structured data by mapping structured feature data to structured text data.

Various embodiments of the present invention make important technical contributions to improving resource-usage efficiency of post-prediction systems by using predicted eligibility scores to set the number of allowed computing entities used by the noted post-prediction systems and thus perform operational load balancing for the post-prediction systems (e.g., for COB investigation systems that use predicted COB scores as inputs to their investigative operations). For example, in some embodiments, a predictive data analysis computing entity determines D investigation classifications for D predictive entities based at least in part on the D predicted eligibility scores for the D predictive input entities. Then, the count of D predictive input entities that are associated with an affirmative investigation classification, along with a resource utilization ratio for each document data object, can be used to predict a predicted number of computing entities needed to perform post-prediction processing operations (e.g., automated investigation operations, such as automated COB investigation operations) with respect to the D predictive entities. For example, in some embodiments, the number of computing entities needed to perform post-prediction processing operations (e.g., automated investigation operations) with respect to D predictive entities can be determined based at least in part on the output of the equation: $R = \text{ceil}(\Sigma_k^{k=K} ur_k)$, where R is the predicted number of computing entities needed to perform post-prediction processing operations with respect to the D predictive entities, ceil(·) is a ceiling function that returns the closest integer that is greater than or equal to the value provided as the input parameter of the ceiling function, k is an index variable that iterates over K predictive entities among the D predictive entities that are associated with affirmative eligibility classifications determined based at least in part on predicted eligibility scores, and $ur_k$ is the estimated resource utilization ratio for a kth predictive entity that may be determined based at least in part on a count of utterances/tokens/words in the kth predictive entity. In some embodiments, once R is generated, a predictive data analysis computing entity can use R to perform operational load balancing for a server system that is configured to perform post-prediction processing operations (e.g., automated investigation operations) with respect to D predictive entities. This may be done by allocating computing entities to the post-prediction processing operations if the number of currently-allocated computing entities is below R, and deallocating currently-allocated computing entities if the number of currently-allocated computing entities is above R.

Various embodiments of the present invention address technical challenges related to accurately determining eligibility predictions for a predictive entity. For example, a predictive entity may be a member of a service provider (e.g., an insurer) and thus, is provided coverage for certain events (e.g., medical visits, prescriptions, medical procedures, and/or the like). However, the predictive entity may also be eligible for supplementary coverage via one or more other supplementary service provides (e.g., Medicare). In order to qualify for said supplementary coverage, a set of criteria must first be satisfied. For example, an individual with a long-term disability may qualify for Medicare. However, current implementations for determining whether an individual satisfies this set of criteria are unreliable and imprecise.

To address the above-noted technical challenges associated with accurately determining eligibility predictions for a predictive entity, various embodiments of the present invention describe a cross-feature-type eligibility prediction machine learning framework that is configured to generate a predicted eligibility score for a predictive entity. Structured feature data comprising various feature data entries associated with a plurality of instantiable feature types may be processed to generate a plurality of feature words. The structured feature data advantageously allows for feature data entries of various instantiable feature types, which may be collected from a variety of data sources (e.g., claim data, prescription data, member data, associated employment institution data, and/or the like). Feature paragraphs, which each correspond to a particular instantiable feature type, may be generated and comprise a related feature word subset of the plurality of feature words associated with the respective instantiable feature type. The cross-feature-type eligibility prediction machine learning framework may be configured to process the plurality of feature type paragraphs to generate the predicted eligibility score for the predictive entity. The cross-feature-type eligibility prediction machine learning framework may comprise one or more feature processing models which are configured to process the plurality of feature type paragraphs and generate a cross-feature-type representation of the structured feature data. The cross-feature-type eligibility prediction machine learning framework may further comprise an eligibility prediction machine learning model that is configured to generate the predicted eligibility score based at least in part on the cross-feature-type representation. One or more prediction-based actions may then be performed based at least in part on the predicted eligibility score for the predictive entity.

In some embodiments, to address the technical challenges associated with accurately determining eligibility predictions for the predictive entity, various embodiments of the present invention describe one or more feature processing machine learning models, which may comprise one or more per-feature-type feature processing machine learning models. Each per-feature-type feature processing machine learning model may be associated with a particular instantiable feature type and configured to process a feature type paragraph associated with the corresponding instantiable feature type. The cross-feature-type representation may then comprise each per-feature-type representation. Advantageously, a per-feature-type feature processing machine learning model may allow for increased accuracy by separately processing each feature type paragraph with a particular per-feature-type feature processing machine learning model, thereby allowing for optimization of parameters corresponding to the particular instantiable feature type.

Alternatively, various embodiments of the present invention describe one or more feature processing machine learning models which may comprise a cross-feature-type feature processing machine learning model. The cross-feature-type feature processing machine learning model may be configured to aggregate the plurality of feature type paragraphs into a cross-feature-type document representation and generate the cross-feature-type representation by processing the cross-feature type document representation. Thus, the cross-feature-type feature processing machine learning model may process each feature type paragraph regardless of the associated instantiable feature type. Advantageously, the cross-feature-type feature processing machine learning model may allow for improved computational efficiency of computer-implemented modules that perform operations corresponding to the cross-feature-type eligibility prediction machine learning framework. As such, the cross-feature-type feature processing machine learning model may generate an cross-feature-type representation while reducing the computational complexity of the runtime operations, thus resulting in a more time efficient and less computationally resource-intensive method to generate a predicted eligibility score for the predictive entity.

An exemplary application of various embodiments of the present invention relate to determining whether a member is eligible for Medicare because of disabilities. To do so, an NLP classifier model is proposed that processes feature data associated with a member to determine the Medicare-disability status for the member. In some embodiments, a disclosed NLP system is configured to: (i) append input feature types with prefixes/suffixes describing feature types to generate feature words, (ii) combine feature words having specific feature categories into feature category paragraphs, (iii) provide each feature category paragraph to a category-specific NLP model, such as an NLP transformer, to generate a paragraph representation, and (iv) process the feature category paragraphs using an ensemble model to generate a prediction.

In some embodiments, the input features of the NLP classifier model include at least one of the following: claims data features (e.g., diagnosis codes, procedure codes, and/or the like) of a member; pharmacy codes of the member; employment status descriptors of the member, such as features describing whether the member has been frequently absent from work; and an inferred and/or retrieved number of employees of the company of the member as determined based at least in part on historical members' investigations of the company and/or based at least in part on associations of members to companies. Additionally, other information types may also be included as input features.

In some embodiments, operations of the NLP classifier model include converting data into sentences: Each claim, each prescription, and each company may be converted into a sentence. In some embodiments, each sentence includes n words corresponding to n features, where each word includes a feature value that could be appended by a feature type of the feature value as a prefix/suffix of the word. In some embodiments, all claim sentences of a member are grouped into a claims paragraph, all prescription sentences of a member are grouped into a prescription paragraph, and all company paragraphs are grouped into a company. In some embodiments, sentences are grouped into documents by temporal alignment and/or by alignment in accordance with other rules. In some embodiments, all non-aligned sentences are grouped into a final paragraph. In some embodiments, all of the paragraphs of a member are grouped into a member document, and then a document-inference is performed on the entire document to determine whether the member is eligible for Medicare because of disabilities. In some embodiments, each paragraph of a member is processed using a paragraph-type-specific NLP model to generate a paragraph representation of the paragraph, and then the paragraph representations of various paragraphs of the member are combined using an ensemble model to determine whether the member is eligible for Medicare because of disabilities. In some embodiments, the NLP model include a transformer-based NLP transformation engine, such as a pretrained transformer-based NLP transformation engine that is retrained based at least in part on healthcare data, and/or a transformer-based NLP transformation engine that is trained from scratch. The NLP model may additionally or alternatively include other trained engines.

II. Definitions of Certain Terms

The term "structured feature data" may refer to an electronically-stored data construct that is configured to describe data describing features associated with a predictive entity in a structured format. The structured feature data may include a plurality of structured feature data entries. The structured feature data may be formatted in any format, arrangement, organization and/or the like, such that each structured feature data entry is identifiable. Additionally, the structured feature data may include structured feature data corresponding to a plurality of feature type instances, which may be associated with a particular event for a predictive entity. In some embodiments, the structured feature data may describe claim data, prescription data, employment institution data, or miscellaneous data which corresponds to the predictive entity. Furthermore, each structured feature data entry may correspond to a particular non-instantiable feature type, which describes a particular category of an instantiable feature type. Each instantiable feature type may be associated with one or more non-instantiable feature types. A structured feature data entry may additionally be associated with feature data entry metadata, which may describe information pertaining to the structured feature data entry. For example, feature data entry metadata may include a timestamp and/or date corresponding to when a feature data entry was generated, a location associated with the feature data entry, a particular institution associated with the feature data entry, and/or the like.

The term "instantiable feature type schema" may refer to an electronically-stored data construct that is configured to describe associations between structured feature data entries and instantiable feature types. In some embodiments, the instantiable feature type schema may associate each structured feature data entry to a particular instantiable feature type from a list of candidate instantiable feature types. For example, the instantiable feature type schema may determine that a particular structured feature data entry that describes a diagnosis code is associated with a "claim" instantiable feature type. As another example, the instantiable feature type schema may determine that a particular structured feature data entry that describes a diagnosis code is associated with a "prescription" instantiable feature type.

The term "feature word" may refer to an electronically-generated data construct that is configured to describe textual representation of a particular structured feature data entry that is associated with a particular instantiable feature type. A feature word may be included within a related feature word subset with one or more other feature words which are associated with the same instantiable feature type. In some embodiments, the feature word may further include a per-feature-type lexical designator, indicative of a non-instantiable feature type corresponding to the structured feature data entry. Accordingly, a feature word may be associated with an underlying value described by a corresponding structured feature data entry, an instantiable feature type, and a non-instantiable feature type. For example, in some embodiments, given an underlying value of "I11.9" described by a structured feature data entry, a non-instantiable feature type describing that the structured feature data entry relates to International Classification of Diseases (ICD) code, and an instantiable feature type describing that the ICD code relates to a medical claim, then the corresponding feature word may be "ICDI11.9" or "I11.9ICD" and may be associated with a medical claim instantiable feature type.

The term "instantiable feature type" may refer to an electronically-stored data construct that is configured to describe a feature category for a feature word, where the feature category may in turn be associated with a set of feature type instances describing a distinct occurrence of an event corresponding to the feature category. In some embodiments, instantiable feature types may include a "claim" instantiable feature type, a "prescription" instantiable feature type, a "company" instantiable feature type, and an "other" instantiable feature type. For example, a "claim" instantiable feature type may be associated with feature type instances each corresponding to a separate medical claim associated with a target member. As another example, a "prescription" instantiable feature type may be associated with feature type instances each corresponding to a separate medical claim associated with a target member. Because an instantiable feature type has a hierarchical conceptual relationship with its feature type instances such that the feature type instances depend from the instantiable feature type, this hierarchical conceptual relationship can be used to convert structured feature data into structured text data. For example, in some embodiments, generating a particular feature type paragraph for a particular instantiable feature type comprises identifying a plurality of feature type instances for the particular instantiable feature type, wherein each feature word in the related feature word subset for particular instantiable feature type is associated with a respective feature type instance; for each feature type instance, determining a feature instance sentence based at least in part on each feature word in the related feature word subset that is associated with the feature type instance; and generating the particular feature type paragraph based at least in part on each feature instance sentence.

The term "feature type instance" may refer to an electronically-stored data construct that is configured to describe a particular distinct occurrence of an event type corresponding to an instantiable feature type. In some embodiments, a feature type instance may correspond to a particular event, document, and/or the like. Furthermore, in some embodiments, a feature type instance may be assigned a particular position within a feature type instance ordered list. The feature type instance ordered list may order each feature type instance associated with an instantiable feature type in a particular order, such as chronologically, alphabetically, and/or the like.

The term "feature input sentence" may refer to an electronically-generated data construct that is configured to describe feature words from a related feature word subset that correspond to a particular feature type instance. In some embodiments, a feature input sentence may be generated according to a non-instantiable feature type schema.

The term "feature type paragraph" may refer to an electronically-generated data construct that is configured to describe a plurality of feature words from a related feature word subset associated with a particular instantiable feature type. In some embodiments, a feature type paragraph may describe a plurality of feature input sentences for a particular instantiable feature type. In some embodiment, the related feature word subset for a particular instantiable feature type describes all feature words associated with the particular instantiable feature type. In some embodiments, the feature type paragraph for a particular instantiable feature type describes all of the feature words in the related feature word subset for the particular instantiable feature type. In some embodiments, the feature type paragraph for a particular instantiable feature type describes a set of feature instance sentences each associated with a feature type instances of the particular instantiable feature type and comprising those feature words associated with the feature type instance. For example, given a set of feature words $W_1$, $W_2$, $W_3$, and $W_4$ that are all associated with a "claims" instantiable feature type, where $W_1$ and $W_2$ are associated with a first claim and $W_3$ and $W_4$ are associated with a second claim, then the feature type paragraph for the "claims" instantiable feature type may comprise the following ordering of two feature instance sentences corresponding to the claims: "$W_1$ $W_2$. $W_3$ $W_4$."

The term "non-instantiable feature type" may refer to an electronically-stored data construct that is configured to describe a feature category of a feature word that is not associated with feature type instances that describe distinct occurrences of events. Examples of non-instantiable feature type include a diagnosis related group (DRG) non-instantiable feature type, a diagnosis (DX) non-instantiable feature type, international classification of disease (ICD) non-instantiable feature type, and member non-instantiable feature type. In one example, while structured feature data for a target member can include multiple DX feature words, each occurrence of a DX feature word is not deemed to describe a separate event occurrence.

The term "non-instantiable feature type schema" may refer to an electronically-stored data construct that is configured to associate structured feature data entries with non-instantiable feature types. In some embodiments, the instantiable feature type schema may determine a particular instantiable feature type from a list of candidate instantiable feature types for each structured feature data entry. For example, the non-instantiable feature type schema may describe that a particular structured feature data entry is associated with a DX non-instantiable feature type.

The term "per-feature-type lexical designator" may refer to an electronically-generated data construct that is configured to describe a textual descriptor that is indicative of a particular non-instantiable feature type. The per-feature-type lexical designator may be used in part to generate the corresponding feature word. For example, in some embodiments, the per-feature-type lexical designator may be appended to the structured feature data entry according to a predefined lexical precedence schema (e.g., as a prefix or a suffix). An example of a per-feature-type lexical designator is the lexical designator "DX" for the DX non-instantiable feature type described above.

The term "predefined lexical precedence schema" may refer to an electronically-stored data construct that is configured to describe a set of rules for generating a feature word based at least in part on a textual representation of the structured feature data entry and a per-feature-type lexical designator for the non-instantiable feature type that is associated with the structured feature data entry. In some embodiments, the predefined lexical precedence schema may require that the textual representation of the structured feature data entry follows the per-feature-type lexical designator (e.g., that the per-feature-type lexical designator is appended as a prefix). For example, given a structured feature data entry having a textual representation of "I11.9" and an ICD code non-instantiable feature type that is associated with the per-feature-type lexical designator "ICD," the corresponding feature word may be "ICDI11.91." Alternatively, the predefined lexical precedence schema requires that the textual representation of the structured feature data entry precedes the per-feature-type lexical designator (e.g., that the per-feature-type lexical designator is appended as a suffix). For example, given a structured feature data entry having a textual representation of "I11.9" and an ICD code non-instantiable feature type that is associated with the per-feature-type lexical designator "ICD," the corresponding feature word may be "I11.91ICD."

The term "cross-feature-type eligibility prediction machine learning framework" may refer to an electronically-stored data construct that is configured to describe parameters, hyper-parameters, and/or defined operations of a set of machine learning models that are collectively configured to generate a predicted eligibility score (e.g., a Coordination of Benefits (COB) score) for a predictive entity (e.g., for a member) based at least in part on a plurality of feature type paragraphs generated based at least in part on structured feature data associated with the predictive entity. In some embodiments, the cross-feature-type eligibility prediction machine learning framework may comprise one or more feature processing machine learning models and an eligibility prediction machine learning model.

The term "feature processing machine learning model" may refer to an electronically-stored data construct that is configured to describe parameters, hyper-parameters, and/or stored operations of a machine learning model that is configured to process a plurality of feature type paragraphs for a predictive entity to generate a cross-feature-type representation for the predictive entity. In some embodiments, the feature processing machine learning model is a trained natural language processing (NLP) machine learning model, such as a trained NLP machine learning model using an attention-based mechanism (e.g., a bidirectional attention-based mechanism). The cross-feature-type representation may be generated based at least in part on the plurality feature type paragraphs. In some embodiments, the feature processing machine learning model may comprise a plurality of per-feature-type feature processing machine learning models. Alternatively, the feature processing machine learning model may comprise a single cross-feature-type feature processing machine learning model. In some embodiments, the feature processing machine learning model may be trained based at least in part on historical feature type paragraphs.

The term "per-feature-type feature processing machine learning model" may refer to an electronically-stored data construct that is configured to describe parameters, hyper-parameters, and/or stored operations of a machine learning model that is configured to process a feature type paragraph associated with a corresponding instantiable feature type to generate a per-feature-type representation for the corresponding instantiable feature type. The per-feature-type feature processing machine learning model may be associated with a particular instantiable feature type and configured to process feature type paragraphs which also are associated with the particular instantiable feature type. In some embodiments, the per-feature-type feature processing machine learning model is a trained NLP model. A plurality of per-feature-type feature processing machine learning models may be configured to each generate a per-feature-type representation and the cross-feature-type representation may comprise each per-feature-type representation. In some embodiments, the inputs to a per-feature-type feature processing machine learning model comprise a set of vectors each describing feature words associated with a feature instance sentence of the corresponding instantiable feature type, while outputs of the per-feature-type feature processing machine learning model include a vector representing the per-feature-type representation for the corresponding instantiable feature type.

The term "cross-feature-type feature processing machine learning model" may refer to an electronically-stored data construct that is configured to describe parameters, hyper-parameters, and/or stored operations of a machine learning model that is configured to process all feature type paragraphs of a predictive entity to generate a cross-feature-type representation of the predictive entity. The cross-feature-type feature processing machine learning model may aggregate each feature type paragraph that is associated with the predictive entity into a cross-feature-type document representation and process the cross-feature-type document representation to generate the cross-feature-type representation. In some embodiments, the cross-feature-type feature processing machine learning model is a trained NLP model. In some embodiments, the inputs to a cross-feature-type feature processing machine learning model comprise a set of vectors each describing feature words associated with a feature instance sentence of the a cross-feature-type document representation, while outputs of the per-feature-type feature processing machine learning model include a vector representing the cross-feature-type representation.

The term "eligibility prediction machine learning model" may refer to an electronically-stored data construct that is configured to describe parameters, hyper-parameters, and/or stored operations of a machine learning model (e.g., a classification machine learning model) that is configured generate a predicted eligibility score for a predictive entity based at least in part on the cross-feature-type representation for the predictive entity. In some embodiments, the eligibility prediction machine learning model is a trained classification model which utilizes embeddings generated using NLP processing techniques. The eligibility prediction machine learning model may be a binary classification machine learning model or a multi-class classification machine learning model. For example, the predicted eligibility score may be either a binary value of 0 or 1, where 0 corresponds to a determination that a predictive entity is ineligible and 1 corresponds to a determination that a predictive entity is eligible. As another example, the predicted eligibility score may be a classification label such as "eligible", "non-eligible", "undetermined", and/or the like. In some embodiments, inputs to the eligibility prediction machine learning model comprise a vector describing a cross-feature-type representation, while outputs of the eligibility prediction machine learning model may comprise a vector and/or an atomic value describing a predicted eligibility score.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing predictive data analysis operations and for performing one or more prediction-based actions (e.g., generating corresponding user interface data). The system architecture 100 includes a predictive data analysis system 101 comprising a predictive data analysis computing entity 106 configured to generate predictive outputs that can be used to perform one or more prediction-based actions. The predictive data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 100 is to a generate a predicted eligibility score.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to train a prediction model (e.g., feature processing machine learning models, eligibility prediction machine learning models, per-feature-type processing machine learning models, and/or cross-feature-type machine learning models) based at least in part on the training data store 122 stored in the storage subsystem 108, store trained prediction models as part of the model definition data store 121 stored in the storage subsystem 108, utilize trained models to generate predictions based at least in part on structured feature data that may be provided by an external computing entity 102, and perform prediction-based actions based at least in part on the generated predictions. The storage subsystem may be configured to store the model definition data store 121 for one or more predictive analysis models and the training data store 122 uses to train one or more predictive analysis models. The predictive data analysis computing entity 106 may be configured to receive requests and/or data from external computing entities 102, process the requests and/or data to generate predictive outputs (e.g., predictive data analysis data objects), and provide the predictive outputs to the external computing entities 102. The external computing entity 102 may periodically update/provide raw input data (e.g., structured feature data) to the predictive data analysis system 101. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity 106 includes a predictive analysis engine 110 and a training engine 112. The predictive analysis engine 110 may be configured to perform predictive data analysis based at least in part on a received user feature data object. For example, the predictive analysis engine 110 may be configured to one or more prediction based actions based at least in part on a fall likelihood prediction. The training engine 112 may be configured to train the predictive analysis engine 110 in accordance with the training data store 122 stored in the storage subsystem 108.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention make important technical contributions to storage-wise efficiency and computational efficiency of performing predictive data analysis using structured data by mapping structured feature data to structured text data (e.g., natural language data having paragraphs and documents). After converting the structured feature data to structured text data, the structured text data can now be used as input data to attention-based natural language processing machine learning models that can be trained without using labeled training data (e.g., using auxiliary tasks such as missing word prediction or sentence reconstruction). In fact, in many instances, such attention-based natural language processing machine learning models are pretrained and require no additional training/retraining. Accordingly, by using the techniques described herein, predictive data analysis systems can either train machine learning models that perform predictive data analysis on structured feature data with smaller amounts of labeled training data (e.g., with no labeled training data) or can altogether avoid training at least some components of the noted machine learning models (e.g., the components that are configured to generate embedded representations of structured feature data). In this way, the noted embodiments of the present invention reduce both the size of training data needed to train machine learning models that perform predictive data analysis on structured feature data and the number of computational operations needed to train machine learning models that perform predictive data analysis on structured feature data. In this way, various embodiments of the present invention make important technical contributions to storage-wise efficiency and computational efficiency of performing predictive data analysis using structured data by mapping structured feature data to structured text data.

In some embodiments, the eligibility of a predictive entity is dependent on a multitude of factors such that an accurate eligibility determination requires processing of structured feature data entries that correspond to a plurality of instantiable feature types. However, current methodologies configured to predict a predictive entities eligibility are limited, as these methodologies are unable to process data corresponding to a plurality of instantiable feature types to generate a predicted eligibility score for the predictive entity. For example, consideration of only the claim history of a predictive entity may incorrectly predict that a user is eligible for supplementary coverage when the predictive entity is actually not eligible due to a current employment status with an employment institution and/or the employment institution data.

As such, to address the technical challenges associated with accurately determining eligibility predictions for a predictive entity, various embodiments of the present invention describe a cross-feature-type eligibility prediction machine learning framework that is configured to generate a predicted eligibility score for a predictive entity. Structured feature data comprising various feature data entries associated with a plurality of instantiable feature types may be processed to generate a plurality of feature words. The structured feature data advantageously allows for feature data entries of various instantiable feature types, which may be collected from a variety of data sources (e.g., claim data, prescription data, member data, associated employment company data, and/or the like). Feature paragraphs which each correspond to a particular instantiable feature type may be generated and comprise a related feature word subset of the plurality of feature words associated with the respective instantiable feature type. The cross-feature-type eligibility prediction machine learning framework may be configured to process the plurality of feature type paragraphs to generate the predicted eligibility score for the predictive entity. The cross-feature-type eligibility prediction machine learning framework may comprise one or more feature processing models which are configured to process the plurality of feature type paragraphs and generate a cross-feature-type representation of the structured feature data. The cross-feature-type eligibility prediction machine learning framework may further comprise an eligibility prediction machine learning model that is configured to generate the predicted eligibility score based at least in part on the cross-feature-type representation. One or more prediction-based actions may then be performed based at least in part on the predicted eligibility score for the predictive entity.

FIG. 4 is a flowchart diagram of an example process 400 for generating an eligibility prediction for a predictive entity. Via the various steps/operations of the process 400, the predictive data analysis computing entity 106 can accurately determine eligibility predictions for a predictive entity.

The process 400 begins at step/operation 401 when the predictive analysis engine 110 of the predictive data analysis computing entity 106 generates a plurality of feature words. The predictive analysis engine 110 may generate the plurality of feature words based at least in part on structured feature data, which may be received from one or more external computing entities 102 and/or retrieved from an associated memory, such as storage subsystem 108. The structured feature data may be associated with a predictive entity and describe data describing features associated with said predictive entity. The structured feature data may include a plurality of structured feature data entries. The structured feature data may be formatted in any format, arrangement, organization and/or the like, such that each structured feature data entry is identifiable.

Additionally, the structured feature data may include structured feature data corresponding to a plurality of feature type instances, which may be associated with a particular feature type instance for a predictive entity. A feature type instance may describe a particular occurrence corresponding to an instantiable feature type. In some embodiments, a feature type instance may correspond to a particular event, document, and/or the like. Furthermore, in some embodiments, a feature type instance may be assigned a particular position within a feature type instance ordered list. The feature type instance ordered list may order each feature type instance associated with an instantiable feature type in a particular order, such as chronological, alphabetically, and/or the like. For example, the structured feature data may describe data for a first claim (i.e., feature type instance 1) and a second claim (i.e., feature type instance 2) corresponding to a claim instantiable feature type and data for a first prescription (i.e., feature type instance 1) corresponding to a prescription instantiable feature type. In some embodiments, the structured feature data may describe claim data (e.g., medical claim data), prescription data, employment institution data, or miscellaneous data which corresponds to the predictive entity. A structured feature data entry may additionally be associated with feature data entry metadata, which may describe information pertaining to the structured feature data entry. For example, feature data entry metadata may include a timestamp and/or date corresponding to when a feature data entry was generated, a location associated with the feature data entry, a particular institution associated with the feature data entry, and/or the like.

The predictive analysis engine 110 may generate the plurality of feature words based at least in part on the structured feature data entry. A feature word may be a particular structured feature data entry that is associated with a particular instantiable feature type. For example, the predictive analysis engine 110 may generate the feature word from a particular structured feature data entry and associate that structured feature data entry with an instantiable feature type defined by an instantiable feature type schema. An instantiable feature type may describe a feature category for a feature word. In some embodiments, instantiable feature types may include a claims instantiable feature type, prescription instantiable feature type, company instantiable feature type, and other instantiable feature type. The instantiable feature type schema may describe a framework for associating structured feature data entries with a particular instantiable feature type to generate feature words. In some embodiments, the instantiable feature type schema may determine a particular instantiable feature type from a list of candidate instantiable feature types (i.e., claims instantiable feature type, prescription instantiable feature type, company instantiable feature type, and other instantiable feature type). Additionally, feature words may be included within a related feature word subset with one or more other feature words which are associated with the same instantiable feature type.

In some embodiments, step/operation 401 may be performed in accordance with the various steps/operations of the process 500 depicted in FIG. 5, which is a flowchart diagram of an example process for generating a feature word from structured feature data.

The process 500 begins at step/operation 501, when the predictive analysis engine 110 of the predictive data analysis computing entity 106 identifies a structured feature data entry from the structured feature data. As described above, the structured feature data may include a plurality of structured feature data formatted in any format, arrangement, organization and/or the like, such that each structured feature data entry is identifiable.

At step/operation 502, the predictive analysis engine 110 of the predictive data analysis computing entity 106 determines a respective non-instantiable feature type for the structured feature data entry. A non-instantiable feature type may describe a category of an instantiable feature type. Each instantiable feature type may be associated with one or more non-instantiable feature types. For example, a claims instantiable feature type may include a diagnosis related group (DRG) non-instantiable feature type, a diagnosis (DX) non-instantiable feature type, international classification of disease (ICD) non-instantiable feature type, and member non-instantiable feature type. The predictive analysis engine 110 may identify the non-instantiable feature type for the structured feature data entry by mapping the structured feature data entry to a non-instantiable feature type schema defining the plurality of non-instantiable feature types. The non-instantiable feature type schema may describe a framework for associating structured feature data entries of a particular instantiable feature type to a non-instantiable feature type. In some embodiments, the instantiable feature type schema may determine a particular instantiable feature type from a list of candidate instantiable feature types.

At step/operation 503, the predictive analysis engine 110 of the predictive data analysis computing entity 106 determines a per-feature-type lexical designator for the respective non-instantiable feature type. A per-feature-type lexical designator may be a descriptor that is indicative of a particular non-instantiable feature type. For example, a per-feature-type lexical designator corresponding to a DRG non-instantiable feature type may have a value of "DRG". As another example, a per-feature-type lexical designator corresponding to a member non-instantiable feature type may have a value or "MBR". As yet another example, the per-feature-lexical designator corresponding to a diagnosis non-instantiable feature type may have a value of "DX", "DX$", "dx", "diag", "diagnosis", etc. The per-feature-type lexical designator may be used in part to generate the corresponding feature word. For example, in some embodiments, the per-feature-type lexical designator may be appended to the structured feature data entry according to a predefined lexical precedence schema. At step/operation 504, the predictive analysis engine 110 of the predictive data analysis computing entity 106 generates the feature word based at least in part on the structured feature data entry, the per-feature-type lexical designator, and a predefined lexical precedence schema. A predefined lexical precedence schema may describe a framework defining a set of rules for generating a feature word which includes a per-feature-type lexical designator. In some embodiments, the predefined lexical precedence schema may require that the structured feature data entry follows the per-feature-type lexical designator. Alternatively, the predefined lexical precedence schema requires that the structured feature data entry precedes the per-feature-type lexical designator.

FIG. 7 shows an operational example of structured feature data 700 which includes structured feature data entries corresponding to a feature type instance 1 of an instantiable feature type A. Here, the structured feature data 700 includes seven structured feature data entries and each structured feature data entry corresponds to a particular non-instantiable feature type. For example, the structured feature data entry with a value of 'E119' corresponds to a 'DX' non-instantiable feature type. In some embodiments, based at least in part on the structured feature data 700, a corresponding feature word with a value of 'E119' may be generated. Alternatively, a feature word which includes the per-feature-type lexical designator may generated. For example, a corresponding feature word with a value of 'DXE119' or 'E119DX' may be generated, depending upon the predefined lexical precedence schema.

Returning now to FIG. 4, at step/operation 402, the predictive analysis engine 110 of the predictive data analysis computing entity 106 generates a plurality of feature type paragraphs. A feature type paragraph may describe a plurality of feature words from a related feature word subset and may be associated with a particular instantiable feature type. The related feature word subset may include one or more feature words corresponding to a particular instantiable feature type. In some embodiments, a feature type paragraph may describe a plurality of feature input sentences for a particular instantiable feature type.

In some embodiments, step/operation 402 may be performed in accordance with the various steps/operations of the process 600 depicted in FIG. 6, which is a flowchart diagram of an example process for generating a feature type paragraph.

The process 600 begins at step/operation 601, when the predictive analysis engine 110 of the predictive data analysis computing entity 106 identifies a plurality of feature type instances for a particular instantiable feature type. For example, a claims instantiable feature type may have three feature type instances corresponding to a first feature type instance, second feature type instance, and third feature type instance.

FIGS. 7 and 9 depict operational examples of structured feature data 700 and 900, respectively. The structured feature data 700 may correspond to a first feature type instance (i.e., feature type instance 1) while the structured feature data 900 may correspond to an nth feature type instance (i.e., feature type instance N), where n is the total number of feature type instances corresponding to an instantiable feature type A.

At step/operation 602, the predictive analysis engine 110 of the predictive data analysis computing entity 106 determines a feature instance sentence for each feature type instance. The feature instance sentence may be determined based at least in part on each feature word in a related feature word set that is associated with the feature type instance.

FIGS. 8A-C depict operational examples of feature instance sentences 801, 802, and 803, respectively based at least in part on the feature words generated based at least in part on the structured feature data 700. Each of feature instance sentences 801-803 were generated using feature words which either did not include a per-feature-type lexical designator (e.g., 801) or included a per-feature-type lexical designator (e.g., 802-803). The feature instance sentence 802 was generated using a predefined lexical precedence schema which required that the structured feature data entry precedes the per-feature-type lexical designator whereas the feature instance sentence 802 was generated using a predefined lexical precedence schema which required that the structured feature data entry follows the per-feature-type lexical designator.

FIG. 10 depicts an operational example of a feature instance sentence 1001 generated based at least in part on the structured feature data 900. Here, although only feature instance sentence 1001 was generated using a predefined lexical precedence schema which required that the structured feature data entry precedes the per-feature-type lexical designator, other feature instance sentences may be contemplated, similarly as described above.

At step/operation 603, the predictive analysis engine 110 of the predictive data analysis computing entity 106 generates a feature type paragraph. The feature type paragraph may be generated based at least in part on each feature instance sentence.

FIG. 11 depicts an operational example of a feature type paragraph 1100 which corresponds to an instantiable feature type A. By way of continuing example, the feature instance sentence 802 depicted in FIG. 8B and the feature instance sentence 1001 depicted in FIG. 10, corresponding for a first feature type instance and nth feature type instance, respectively, may be included in the feature type paragraph 1100.

Returning now to FIG. 4, at step/operation 403, the predictive analysis engine 110 of the predictive data analysis computing entity 106 generates a predicted eligibility score. In some embodiments, the predictive analysis engine 110 may generate the predicted eligibility score using a cross-feature-type eligibility prediction machine learning framework. The cross-feature-type eligibility prediction machine learning framework may be configured to generate a predicted eligibility score for a predictive entity based at least in part on a plurality of feature type paragraphs. In some embodiments, the cross-feature-type eligibility prediction machine learning framework may comprise one or more feature processing machine learning models and an eligibility prediction machine learning model.

The one or more feature processing machine learning models may describe parameters, hyper-parameters, and/or stored operations of a machine learning model that is configured to process a plurality of feature type paragraphs to generate a cross-feature-type representation. In some embodiments, the feature processing machine learning model is a trained NLP model. The cross-feature-type representation may be generated based at least in part on the plurality feature type paragraphs. In some embodiments, the feature processing machine learning model may comprise a plurality of per-feature-type feature processing machine learning models. Alternatively, the feature processing machine learning model may comprise a cross-feature-type feature processing machine learning model. In some embodiments, the feature processing machine learning model may be trained based at least in part on historical feature type paragraphs.

A cross-feature-type feature processing machine learning model may describe parameters, hyper-parameters, and/or stored operations of a machine learning model that is configured to process feature type paragraphs to generate a cross-feature-type representation. The cross-feature-type feature processing machine learning model may aggregate each feature type paragraph into a cross-feature-type document representation and process the cross-feature-type document representation to generate the cross-feature-type representation. In some embodiments, the cross-feature-type feature processing machine learning model is a trained NLP model.

FIG. 12 illustrates exemplary feature processing machine learning models 1200 which comprises a cross-feature-type feature processing machine learning model 1204 in accordance with some embodiments. The cross-feature-type feature processing machine learning model 1204 may be configured to aggregate the plurality of feature type paragraphs 1201-1203, each corresponding to a particular instantiable feature type, into a cross-feature type document representation of the structured feature data. The cross-feature-type feature processing machine learning model 1204 may then process the cross-feature type document representation to generate the cross-feature type representation 1205, which may then be provided to an eligibility prediction machine learning model.

A per-feature-type feature processing machine learning model may describe parameters, hyper-parameters, and/or stored operations of a machine learning model that is configured to process a feature type paragraph associated with a corresponding instantiable feature type to generate a per-feature-type representation. The per-feature-type feature processing machine learning model may be associated with a particular instantiable feature type and configured to process feature type paragraphs which also are associated with the particular instantiable feature type. In some embodiments, the per-feature-type feature processing machine learning model is a trained NLP model. A plurality of per-feature-type feature processing machine learning models may be configured to each generate a per-feature-type representation and the cross-feature-type representation may comprise each per-feature-type representation.

FIG. 13 illustrates exemplary feature processing machine learning model 1300 which comprises a plurality of per-feature-type feature processing machine learning models 1301-1303 in accordance with some embodiments. Each per-feature-type feature processing machine learning model may be configured to process a particular feature type paragraph 1201-1203. Here, the per-feature-type processing machine learning model may be associated with a particular instantiable feature type. For example, the per-feature-type feature processing machine learning model 1301 may be associated with a instantiable feature type A, the per-feature-type feature processing machine learning model 1302 may be associated with a instantiable feature type B, the per-feature-type feature processing machine learning model may be associated with a instantiable feature type Z, and/or the like. As such, the per-feature-type feature processing machine learning model 1301 may be configured to process feature type paragraphs which correspond to an instantiable feature type A, the per-feature-type feature processing machine learning model 1302 may be configured to process feature type paragraphs which correspond to an instantiable feature type B, the per-feature-type feature processing machine learning model 1303 may be configured to process feature type paragraphs which correspond to an instantiable feature type Z, and/or the like. to each generate a per-feature-type representation 1304-1306. Each per-feature-type representation 1304-1306 may be combined to generate the cross-feature-type representation 1307, which may then be provided to an eligibility prediction machine learning model.

Regardless of whether the one or more feature processing machine learning models comprise a cross-feature-type feature processing machine learning model or a plurality of per-feature-type feature processing machine learning models, a cross-feature-type representation may be generated. FIG. 14 depicts an operational example of a cross-feature-type representation 1400. The cross-feature-type representation 1400 includes each feature type paragraph from each instantiable feature type corresponding to the structured feature data.

The cross-feature-type representation may be processed using an eligibility prediction machine learning model. The eligibility prediction machine learning model may describe parameters, hyper-parameters, and/or stored operations of a machine learning model that is configured generate a predicted eligibility score based at least in part on the cross-feature-type representation. In some embodiments, the eligibility prediction machine learning model is a trained classification model which utilizes NLP processing techniques. The eligibility prediction machine learning model may a binary classification machine learning model or a multi-class classification machine learning model. For example, the predicted eligibility score may be either a binary value of 0 or 1, where 0 corresponds to a determination that a predictive entity is ineligible and 1 corresponds to a determination that a predictive entity is eligible. As another example, the predicted eligibility score may be a classification label such as "eligible", "non-eligible", "undetermined", and/or the like. The eligibility of the predictive entity may then be determined based at least in part on whether the predicted eligibility score satisfies one or more predicted eligibility score thresholds. For example, if the predicted eligibility score has a value of 0.7 and a predicted eligibility score threshold which requires predicted eligibility scores above 0.6, then the predictive entity may be classified as eligible. As another example, if the predicted eligibility score has a value of 0.7 and a predicted eligibility score threshold which requires predicted eligibility scores above 0.8, then the predictive entity may be classified as not eligible.

At step/operation 404, the predictive analysis engine 110 of the predictive data analysis computing entity 106 performs one or more actions based at least in part on the predicted eligibility score. In some embodiments, the one or more actions include generating an eligibility alert notification indicative of whether the predictive entity is eligible for a service, such as supplementary coverage. The eligibility alert notification may be provided to one or more client computing entities 102 such the one or more end users may be aware of the predicted eligibility status of the predictive entity. As such, the one or more users may automatically be informed of predictive entities which are eligible for services.

In some embodiments, the one or more actions may include automatically settling pending financial instrument requests associated with the predictive entity based at least in part on the predicted eligibility score for the predictive entity. For example, if the pending financial instrument is a medical claim requesting fulfillment of payment and the predictive entity is predicted to be eligible for supplementary coverage, only a portion of the requested payment may be fulfilled.

FIG. 15 depicts an operational example of an eligibility alert notification 1500. The eligibility alert notification 1500 may be indicative of the particular predictive entity (e.g., John Doe), the predicted eligibility score, information pertaining to the generation of the predicted eligibility score (e.g., time/date the predicted eligibility score was generated), and one or more recommendations.

In some embodiments, performing the actions comprises performing operational load balancing for the post-prediction systems (e.g., for COB investigation systems that use predicted COB scores as inputs to their investigative operations). For example, in some embodiments, a predictive data analysis computing entity determines D investigation classifications for D predictive entities based at least in part on the D predicted eligibility scores for the D predictive input entities. Then, the count of D predictive input entities that are associated with an affirmative investigation classification, along with a resource utilization ratio for each document data object, can be used to predict a predicted number of computing entities needed to perform post-prediction processing operations (e.g., automated investigation operations, such as automated COB investigation operations) with respect to the D predictive entities. For example, in some embodiments, the number of computing entities needed to perform post-prediction processing operations (e.g., automated investigation operations) with respect to D predictive entities can be determined based at least in part on the output of the equation: $R = \text{ceil}(\Sigma_k^{k=K} ur_k)$, where R is the predicted number of computing entities needed to perform post-prediction processing operations with respect to the D predictive entities, $\text{ceil}(\cdot)$ is a ceiling function that returns the closest integer that is greater than or equal to the value provided as the input parameter of the ceiling function, k is an index variable that iterates over K predictive entities among the D document data that are associated with affirmative eligibility classifications determined based at least in part on predicted eligibility scores, and $ur_k$ is the estimated resource utilization ratio for a kth predictive entity that may be determined based at least in part on a count of utterances/tokens/words in the kth predictive entity. In some embodiments, once R is generated, a predictive data analysis computing entity can use R to perform operational load balancing for a server system that is configured to perform post-prediction processing operations (e.g., automated investigation operations) with respect to D predictive entities. This may be done by allocating computing entities to the post-prediction processing operations if the number of currently-allocated computing entities is below R, and deallocating currently-allocated computing entities if the number of currently-allocated computing entities is above R.

Accordingly, various embodiments of the present invention accurate eligibility prediction determinations for a predictive entity. The disclosed techniques enable using a pairwise interaction score machine learning model to determine a pairwise interaction score for each event code pair of a plurality of event code pairs indicative of the significance of interaction between the event codes described by the particular event code pair. The pairwise interaction score may be used in part to generate an anomaly detection matrix data object, which may in turn be used to determine an anomalous code subset which includes one or more anomalous event codes. As such, this allows for dynamic and predictive detection of anomalous event codes within a primary event data object and thus avoids the need for manual review. Furthermore, this allows for the early detection of anomalous event codes which reduces the expenditure of computation resource at a later time after the anomalous event codes have been processed. As such, the disclosed techniques for predictive anomaly detection improve effectiveness and efficiency of various predictive data analysis operations. In doing so, various embodiments of the present invention make further important technical contributions to the fields of predictive data analysis and machine learning.

Accordingly, as described above, various embodiments of the present invention make important technical contributions to storage-wise efficiency and computational efficiency of performing predictive data analysis using structured data by mapping structured feature data to structured text data (e.g., natural language data having paragraphs and documents). After converting the structured feature data to structured text data, the structured text data can now be used as input data to attention-based natural language processing machine learning models that can be trained without using labeled training data (e.g., using auxiliary tasks such as missing, masked, and/or replaced word prediction or sentence reconstruction). In fact, in many instances, such attention-based natural language processing machine learning models are pretrained and require no additional training/retraining. Accordingly, by using the techniques described herein, predictive data analysis systems can either train machine learning models that perform predictive data analysis on structured feature data with smaller amounts of labeled training data (e.g., with no labeled training data) or can altogether avoid training at least some components of the noted machine learning models (e.g., the components that are configured to generate embedded representations of structured feature data). In this way, the noted embodiments of the present invention reduce both the size of training data needed to train machine learning models that perform predictive data analysis on structured feature data and the number of computational operations needed to train machine learning models that perform predictive data analysis on structured feature data. In this way, various embodiments of the present invention make important technical contributions to storage-wise efficiency and computational efficiency of performing predictive data analysis using structured data by mapping structured feature data to structured text data.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A computer-implemented method comprising:

generating, by one or more processors and based at least in part on structured feature data associated with a predictive entity, a plurality of feature words that is respectively associated with a plurality of instantiable feature types defined by an instantiable feature type schema;

generating, by the one or more processors, a plurality of feature type paragraphs based at least in part on the plurality of feature words, wherein a feature type paragraph of the plurality of feature type paragraphs (a) is associated with an instantiable feature type of the plurality of instantiable feature types and (b) comprises a related feature word subset of the plurality of feature words that is associated with the instantiable feature type;

generating, by the one or more processors, using a cross-feature-type eligibility prediction machine learning framework, and based at least in part on the plurality of feature type paragraphs, a predicted eligibility score for the predictive entity, wherein the cross-feature-type eligibility prediction machine learning framework comprises: (a) one or more feature processing machine learning models that are configured to process the plurality of feature type paragraphs to generate a cross-feature-type representation of the structured feature data, and (b) an eligibility prediction machine learning model that is configured to generate the predicted eligibility score based at least in part on the cross-feature-type representation; and initiating, by the one or more processors, the performance of one or more prediction-based actions based at least in part on the predicted eligibility score.

2. The computer-implemented method of claim 1, wherein:

the one or more feature processing machine learning models comprise a per-feature-type feature processing machine learning model corresponding to the instantiable feature type that is configured to process the feature type paragraph to generate a per-feature-type representation; and the cross-feature-type representation comprises a plurality of per-feature-type representations respectively corresponding to the plurality of feature type paragraphs.

3. The computer-implemented method of claim 1, wherein:

the one or more feature processing machine learning models comprise a cross-feature-type feature processing machine learning model that is configured to: (a) aggregate the plurality of feature type paragraphs into a cross-feature-type document representation of the structured feature data, and (b) process the cross-feature-type document representation to generate the cross-feature-type representation.

4. The computer-implemented method of claim 1, wherein generating the feature type paragraph for the instantiable feature type comprises:

identifying a plurality of feature type instances for the instantiable feature type based on the related feature word subset;

determining one or more feature instance sentences based at least in part on the related feature word subset; and generating the feature type paragraph based at least in part on the one or more feature instance sentences.

5. The computer-implemented method of claim 1, wherein generating a feature word of the plurality of feature words comprises:

identifying a structured feature data entry from the structured feature data;

determining a non-instantiable feature type of a plurality of non-instantiable feature types for the structured feature data entry by mapping the structured feature data entry to a non-instantiable feature type schema defining the plurality of non-instantiable feature types;

determining a per-feature-type lexical designator for the non-instantiable feature type; and generating the feature word based at least in part on the structured feature data entry, the per-feature-type lexical designator, and a predefined lexical precedence schema.

6. The computer-implemented method of claim 5, wherein the predefined lexical precedence schema requires that the structured feature data entry follows the per-feature-type lexical designator.

7. The computer-implemented method of claim 5, wherein the predefined lexical precedence schema requires that the structured feature data entry precedes the per-feature-type lexical designator.

8. A system comprising memory and one or more processors communicatively coupled to the memory, the one or more processors configured to:

generate, based at least in part on structured feature data associated with a predictive entity, a plurality of feature words that is respectively associated with a plurality of instantiable feature types defined by an instantiable feature type schema;

generate a plurality of feature type paragraphs based at least in part on the plurality of feature words, wherein a feature type paragraph of the plurality of feature type paragraphs (a) is associated with an instantiable feature type of the plurality of instantiable feature types and (b) comprises a related feature word subset of the plurality of feature words that is associated with the instantiable feature type;

generate, using a cross-feature-type eligibility prediction machine learning framework and based at least in part on the plurality of feature type paragraphs, a predicted eligibility score for the predictive entity, wherein the cross-feature-type eligibility prediction machine learning framework comprises: (a) one or more feature processing machine learning models that are configured to process the plurality of feature type paragraphs to generate a cross-feature-type representation of the structured feature data, and (b) an eligibility prediction machine learning model that is configured to generate the predicted eligibility score based at least in part on the cross-feature-type representation; and initiate the performance of one or more prediction-based actions based at least in part on the predicted eligibility score.

9. The system of claim 8, wherein:

the one or more feature processing machine learning models comprise a per-feature-type feature processing machine learning model corresponding to the instantiable feature type that is configured to process the feature type paragraph to generate a per-feature-type representation; and the cross-feature-type representation comprises a plurality of per-feature-type representations respectively corresponding to the plurality of feature type paragraphs.

10. The system of claim 8, wherein:
the one or more feature processing machine learning models comprise a cross-feature-type feature processing machine learning model that is configured to: (a) aggregate the plurality of feature type paragraphs into a cross-feature-type document representation of the structured feature data, and (b) process the cross-feature-type document representation to generate the cross-feature-type representation.

11. The system of claim 8, wherein to generate the feature type paragraph for the instantiable feature type, the one or more processors are further configured to:
identify a plurality of feature type instances for the instantiable feature type based on the related feature word subset;
determine one or more feature instance sentences based at least in part on the related feature word subset; and
generate the feature type paragraph based at least in part on the one or more feature instance sentences.

12. The system of claim 8, wherein to generate a feature word of the plurality of feature words, the one or more processors are further configured to:
identify a structured feature data entry from the structured feature data;
determine a non-instantiable feature type of a plurality of non-instantiable feature types for the structured feature data entry by mapping the structured feature data entry to a non-instantiable feature type schema defining the plurality of non-instantiable feature types;
determine a per-feature-type lexical designator for the non-instantiable feature type; and
generate the feature word based at least in part on the structured feature data entry, the per-feature-type lexical designator, and a predefined lexical precedence schema.

13. The system of claim 12, wherein the predefined lexical precedence schema requires that the structured feature data entry follows the per-feature-type lexical designator.

14. The system of claim 12, wherein the predefined lexical precedence schema requires that the structured feature data entry precedes the per-feature-type lexical designator.

15. One or more non-transitory computer-readable storage media including instructions that, when executed by one or more processors, cause the one or more processors to:
generate, based at least in part on structured feature data associated with a predictive entity, a plurality of feature words that is respectively associated with a plurality of instantiable feature types defined by an instantiable feature type schema;
generate a plurality of feature type paragraphs based at least in part on the plurality of feature words, wherein a feature type paragraph of the plurality of feature type paragraphs (a) is associated with an instantiable feature type of the plurality of instantiable feature types and (b) comprises a related feature word subset of the plurality of feature words that is associated with the instantiable feature type;
generate, using a cross-feature-type eligibility prediction machine learning framework and based at least in part on the plurality of feature type paragraphs, a predicted eligibility score for the predictive entity, wherein the cross-feature-type eligibility prediction machine learning framework comprises: (a) one or more feature processing machine learning models that are configured to process the plurality of feature type paragraphs to generate a cross-feature-type representation of the structured feature data, and (b) an eligibility prediction machine learning model that is configured to generate the predicted eligibility score based at least in part on the cross-feature-type representation; and
initiate the performance of one or more prediction-based actions based at least in part on the predicted eligibility score.

16. The one or more non-transitory computer-readable storage media of claim 15, wherein:
the one or more feature processing machine learning models comprise a per-feature-type feature processing machine learning model corresponding to the instantiable feature type that is configured to process the feature type paragraph to generate a per-feature-type representation; and
the cross-feature-type representation comprises a plurality of per-feature-type representations respectively corresponding to the plurality of feature type paragraphs.

17. The one or more non-transitory computer-readable storage media of claim 15, wherein:
the one or more feature processing machine learning models comprise a cross-feature-type feature processing machine learning model that is configured to: (a) aggregate the plurality of feature type paragraphs into a cross-feature-type document representation of the structured feature data, and (b) process the cross-feature-type document representation to generate the cross-feature-type representation.

18. The one or more non-transitory computer-readable storage media of claim 15, wherein to generate the feature type paragraph for the instantiable feature type, the one or more processors are further caused to:
identify a plurality of feature type instances for the instantiable feature type based on the related feature word subset;
determine one or more feature instance sentences based at least in part on the related feature word subset; and
generate the feature type paragraph based at least in part on the one or more feature instance sentences.

19. The one or more non-transitory computer-readable storage media of claim 15, wherein to generate a feature word of the plurality of feature words, the one or more processors are further caused to:
identify a structured feature data entry from the structured feature data;
determine a non-instantiable feature type of a plurality of non-instantiable feature types for the structured feature data entry by mapping the structured feature data entry to a non-instantiable feature type schema defining the plurality of non-instantiable feature types;
determine a per-feature-type lexical designator for the non-instantiable feature type; and
generate the feature word based at least in part on the structured feature data entry, the per-feature-type lexical designator, and a predefined lexical precedence schema.

20. The one or more non-transitory computer-readable storage media of claim 19, wherein the predefined lexical precedence schema requires that the structured feature data entry follows the per-feature-type lexical designator.

\* \* \* \* \*